US012441957B2

(12) United States Patent
Kita et al.

(10) Patent No.: US 12,441,957 B2
(45) **Date of Patent: *Oct. 14, 2025**

(54) DETERGENT COMPOSITION FOR FIBERS

(71) Applicant: KAO CORPORATION, Tokyo (JP)

(72) Inventors: Ayako Kita, Wakayama (JP); Yoshinori Otani, Wakayama (JP); Hiroki Takumi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 18/268,654

(22) PCT Filed: Dec. 23, 2021

(86) PCT No.: PCT/JP2021/047861

§ 371 (c)(1),
(2) Date: Jun. 21, 2023

(87) PCT Pub. No.: WO2022/138819

PCT Pub. Date: Jun. 30, 2022

(65) Prior Publication Data

US 2024/0052261 A1 Feb. 15, 2024

(30) Foreign Application Priority Data

Dec. 25, 2020 (JP) ................................ 2020-217302

(51) Int. Cl.
*C11D 1/14* (2006.01)
*C11D 1/831* (2006.01)
*C11D 3/34* (2006.01)

(52) U.S. Cl.
CPC .............. *C11D 1/143* (2013.01); *C11D 1/831* (2013.01); *C11D 3/3409* (2013.01); *C11D 2111/12* (2024.01)

(58) Field of Classification Search
CPC ......... C11D 3/3409; C11D 1/143; C11D 1/37; C11D 3/43; C11D 1/72; C11D 1/8305; C11D 1/123; C11D 1/29; C11D 2111/12; C11D 3/20; C11D 1/83; C11D 1/831; D06L 1/12; D06L 1/20; D06M 13/224; D06M 13/17; D06M 13/256
See application file for complete search history.

(56) References Cited

U.S. PATENT DOCUMENTS

| | | | |
|---|---|---|---|
| 4,434,087 | A | 2/1984 | Hampson et al. |
| 6,048,831 | A | 4/2000 | Mori et al. |
| 8,454,709 | B2 | 6/2013 | Man et al. |
| 9,877,906 | B2 | 1/2018 | Doi et al. |
| 2007/0214999 | A1 | 9/2007 | Meyer et al. |
| 2014/0076344 | A1 | 3/2014 | Doi et al. |
| 2017/0281498 | A1 | 10/2017 | Yoshikawa et al. |
| 2019/0169536 | A1 | 6/2019 | Tabuchi et al. |

FOREIGN PATENT DOCUMENTS

| | | | | | |
|---|---|---|---|---|---|
| CN | 102712563 | A | | 10/2012 | |
| CN | 106833925 | A | | 6/2017 | |
| CN | 109072129 | A | | 12/2018 | |
| CN | 109679778 | A | | 4/2019 | |
| EP | 0365170 | A1 | | 4/1990 | |
| EP | 2899258 | A1 | | 7/2015 | |
| EP | 3467081 | A1 | * | 4/2019 | ........... C07C 229/16 |
| EP | 3498811 | A1 | | 6/2019 | |
| JP | S57-53600 | A | | 3/1982 | |
| JP | S62195096 | A | | 8/1987 | |
| JP | H02182967 | A | | 7/1990 | |
| JP | H03153798 | A | | 7/1991 | |
| JP | H08-325935 | A | | 12/1996 | |
| JP | 2005154505 | A | | 6/2005 | |
| JP | 2010126561 | A | | 6/2010 | |
| JP | 2011190554 | A | | 9/2011 | |
| JP | 2014076988 | A | | 5/2014 | |
| JP | 2015028123 | A | | 2/2015 | |
| JP | 2015120984 | A | * | 7/2015 | |
| JP | 2017214567 | A | | 12/2017 | |
| JP | 2018066102 | A | | 4/2018 | |
| JP | 2020063435 | A | | 4/2020 | |
| WO | WO-1998024865 | | | 6/1998 | |
| WO | WO-2015125753 | A1 | | 8/2015 | |
| WO | WO-2016196555 | A1 | | 12/2016 | |
| WO | WO-2017204149 | A1 | | 11/2017 | |
| WO | WO-2018030328 | A1 | | 2/2018 | |
| WO | WO-2021187488 | A1 | | 9/2021 | |

OTHER PUBLICATIONS

International Search Report issued Mar. 1, 2022 in PCT/JP2021/047861, 5 pages.
English translation of the International Preliminary Report on Patentability and Written Opinion issued Jul. 6, 2023 in PCT/JP2021/047861, 7 pages.
Extended European Search Report issued Mar. 17, 2025, in corresponding European Patent Application No. 21910959.2, 11 pages.
Extended European Search Report issued Dec. 23, 2024, in corresponding European Patent Application No. 21910957.6, 10 pages.
Combined Chinese Office Action and Search Report issued Apr. 3, 2025, in corresponding Chinese Patent Application No. 202180087407.0 (with partial English translation), 13 pages.

(Continued)

*Primary Examiner* — Vishal V Vasisth
(74) *Attorney, Agent, or Firm* — Element IP, PLC

(57) ABSTRACT

The present invention is a detergent composition for fibers that contains components (a) and (b) described below and satisfies at least one requirement of the following: requirement (1) a proportion of a content of component (a) to a total content of components (a) and (b1) is 35 mass % or more and 80 mass % or less; and requirement (2) a proportion of the content of component (a) to a total content of components (a) and (b2) is 50 mass % or more and 80 mass % or less. Component (a) is a sulfosuccinic acid ester or a salt thereof having a branched hydrocarbon group with 5 or more and 18 or less carbons, and component (b) is one or more surfactants selected from the following components (b1) and (b2): component (b1) an anionic surfactant (excluding component (a)); and component (b2) one or more nonionic surfactants selected from an aliphatic alcohol alkoxylate and an ester alkoxylate.

12 Claims, No Drawings

(56) References Cited

OTHER PUBLICATIONS

English translation of the International Preliminary Report on Patentability and Written Opinion issued Jul. 6, 2023, in PCT/JP2021/047860, 7 pages.
English translation of the International Preliminary Report on Patentability and Written Opinion issued Jul. 6, 2023, in PCT/JP2021/047862, 6 pages.
International Search Report issued Mar. 1, 2022, in PCT/JP2021/047860 (with English translation), 4 pages.
International Search Report issued Mar. 1, 2022, in PCT/JP2021/047862 (with English translation), 4 pages.
Office Action mailed Oct. 18, 2024 in co-pending U.S. Appl. No. 18/269,313.
Office Action mailed Oct. 18, 2024, in co-pending U.S. Appl. No. 18/267,876.
Stapersma, J., et al., "Hydroxy Alkane Sulfonate (HAS), a New Surfactant Based on Olefins", J. Am. Oil Chem. Soc., vol. 69, No. 1, Jan. 1992, pp. 39-43.

* cited by examiner

DETERGENT COMPOSITION FOR FIBERS

This application is a 371 of PCT/JP2021/047861 filed Dec. 23, 2021

FIELD OF THE INVENTION

The present invention relates to a detergent composition for fibers and a method for treating a textile product.

BACKGROUND OF THE INVENTION

Conventionally, anionic surfactants such as sulfosuccinic acid ester salts or the like have been used as a detergent component for home use and industrial use.

JP-A 2011-190554 discloses an in-bath quality improving agent for use in fiber processing that contains a specific ester component, a specific sulfosuccinic acid type anionic surfactant and a specific amide compound as essential components.

JP-A S57-053600 discloses a detergent composition for use in dry cleaning that contains a specific quaternary ammonium salt type cationic surfactant, a specific dialkyl sulfosuccinic acid ester or a salt thereof, a nonionic surfactant and a solvent for use in dry cleaning under a predetermined condition.

JP-A H8-325935 discloses a finishing agent for fibers using a sulfosuccinic acid ester salt type anionic surfactant having a group that reacts with a glycidyl group and a compound having at least two glycidyl groups in combination.

WO-A 1998/024865 discloses a surfactant composition useful as a liquid detergent for clothes that contains a predetermined nonionic surfactant and an anionic surfactant selected from among alkylsulfofatty acid salts, dialkylsulfosuccinic acid salts and others at a predetermined formulation ratio.

WO-A 2015/125753 discloses a treatment agent for elastic fibers that contains a base component such as silicone oil or the like, an organic phosphate or the like and a dialkylsulfosuccinic acid ester salt under a predetermined condition.

WO-A 2018/030328 discloses a surfactant composition that contains an internal olefin sulfonic acid and/or a salt thereof, an anionic surfactant other than the internal olefin sulfonic acid and/or salt thereof, a nonionic surfactant and water under a predetermined condition.

SUMMARY OF THE INVENTION

There is a problem that it is difficult to remove textile products from a washing machine after washing (for example, after dehydration) when washing them in a washing machine.

The present invention provides a detergent composition for fibers and a method for treating a textile product having good washing performance for textile products and making it easier to remove textile products from washing machines after washing.

The present invention relates to a detergent composition for fibers containing the following components (a) and (b),

- component (a): a sulfosuccinic acid ester or a salt thereof having a branched hydrocarbon group with 5 or more and 18 or less carbons, and
- component (b): one or more surfactants selected from the following components (b1) and (b2) (excluding component (a)),
- component (b1): an anionic surfactant, and
- component (b2): one or more nonionic surfactants selected from an aliphatic alcohol alkoxylate and an ester alkoxylate,
- wherein the composition satisfies at least one of the following requirements (1) and (2),
- requirement (1): a proportion of a content of component (a) to a total content of components (a) and (b1) is 35 mass % or more and 80 mass % or less, and
- requirement (2): a proportion of the content of component (a) to a total content of components (a) and (b2) is 50 mass % or more and 80 mass % or less.

Further, the present invention relates to a method for treating a textile product including, washing the textile product with a washing liquid obtained by mixing the following components (a) and (b) with water, and thereafter rinsing the textile product with water,

- component (a): a sulfosuccinic acid ester or a salt thereof having a branched hydrocarbon group with 5 or more and 18 or less carbons, and
- component (b): one or more surfactants selected from the following components (b1) and (b2) (excluding component (a)),
- component (b1): an anionic surfactant, and
- component (b2): one or more nonionic surfactants selected from an aliphatic alcohol alkoxylate and an ester alkoxylate,
- wherein the washing liquid satisfies at least one of the following requirements (1) and (2),
- requirement (1): a proportion of a content of component (a) to a total content of components (a) and (b1) in the washing liquid is 35 mass % or more and 80 mass % or less, and
- requirement (2): a proportion of the content of component (a) to a total content of components (a) and (b2) in the washing liquid is 50 mass % or more and 80 mass % or less.

According to the present invention, provided are a detergent composition for fibers and a method for treating a textile product having good washing performance for textile products and making it easier to remove textile products from washing machines after washing.

EMBODIMENTS OF THE INVENTION

The present invention is based on the finding that a composition including components (a) and (b) at a predetermined content proportion has good washing performance for textile products and the ability to make it easier to remove textile products from washing machines after washing (for example, after dehydration). While the mechanism for this is uncertain, it is inferred that the detergent composition for fibers of the present invention reduces friction force between fibers in a wet state during washing while maintaining good washing performance as a hydrate solid of component (a) is formed on the surface of the fibers. Here, it is inferred that the formation of the hydrate solid is facilitated in a system where components (a) and (b1) are used in combination. On the other hand, the formation of hydrate solids generally tends to be suppressed when anionic surfactants and component (b2) are used in combination, but it is inferred that the formation of the hydrate solid of component (a) is not impaired but maintained in a system where component (a), which is the specific anionic surfactant, and component (b2) are used in combination. It is believed that this results in the suppression of entanglement of textile products and the achievement of both good washing performance and ease of removal of laundry or the like. It is also expected that the detergent composition for fibers and the method for treating a textile product of the present invention reduce washing damage or reduce wrinkles in textile products after washing to improve finishing performance as they reduce friction force between fibers in a wet state during washing.

<Detergent Composition for Fibers>

The detergent composition for fibers of the present invention contains a sulfosuccinic acid ester or a salt thereof having a branched hydrocarbon group with 5 or more and 18 or less carbons [hereinafter referred to as component (a)], and (b) a predetermined surfactant [hereinafter referred to as component (b)]. Component (b) is one or more surfactants selected from (b1) an anionic surfactant (excluding component (a)) [hereinafter referred to as component (b1)] and (b2) a predetermined nonionic surfactant [hereinafter referred to as component (b2)]. Component (b2) is one or more nonionic surfactants selected from an aliphatic alcohol alkoxylate and an ester alkoxylate.

Component (a) is a sulfosuccinic acid ester or a salt thereof having a branched hydrocarbon group with 5 or more and 18 or less carbons.

Component (a) is preferably a sulfosuccinic acid diester or a salt thereof having two branched hydrocarbon groups with 5 or more and 18 or less carbons [hereinafter referred to as component (a1)]. Component (a) is preferably a sulfosuccinic acid diester or a salt thereof having two branched hydrocarbon groups with 5 or more and 18 or less carbons, the two hydrocarbon groups having 20 or more carbons in total. The two hydrocarbon groups in this sulfosuccinic acid diester or salt thereof have preferably 30 or less and more preferably 24 or less carbons in total.

Examples of component (a1) include a compound represented by the following general formula (a1):

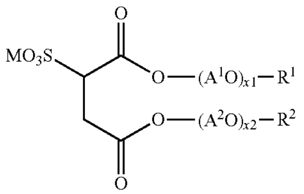

(a1)

wherein $R^1$ and $R^2$ each represent a branched hydrocarbon group with 5 or more and 18 or less carbons, $A^1O$ and $A^2O$ each represent an alkyleneoxy group with 2 or more and 4 or less carbons, x1 and x2 represent an average number of added moles, and each represent a number of 0 or more and 10 or less, and M represents a cation.

$R^1$ and $R^2$ in the general formula (a1) may be the same or different, and each represent a branched hydrocarbon group with 5 or more and 18 or less carbons. Examples of the hydrocarbon group include an alkyl group and an alkenyl group. An alkyl group is preferable from the viewpoint of ease of removal of laundry or the like.

The carbon numbers of the hydrocarbon groups of $R^1$ and $R^2$ in the general formula (a1) are 5 or more, preferably 6 or more, more preferably 8 or more and further preferably 10 or more from the viewpoint of ease of removal of laundry or the like, and 18 or less, preferably 15 or less and more preferably 12 or less from the viewpoint of washing performance.

The total number of carbons in $R^1$ and $R^2$ in the general formula (a1) is preferably 12 or more, more preferably 16 or more and further preferably 20 or more, and preferably 30 or less and more preferably 24 or less from the viewpoint of ease of removal of laundry or the like. Here, when the composition contains two or more compounds having different total numbers of carbons in $R^1$ and $R^2$ as component (a1), the total number of carbons in $R^1$ and $R^2$ of the entire component (a1) represents the molar average of the total numbers of carbons in $R^1$ and $R^2$ of those compounds.

The hydrocarbon groups of $R^1$ and $R^2$ in the general formula (a1) are branched from the viewpoint of ease of removal of laundry or the like. The branched hydrocarbon groups of $R^1$ and $R^2$ each preferably have a side chain with 2 or more carbons and more preferably have a side chain with 3 or more carbons from the viewpoint of ease of removal of laundry or the like. The carbon numbers of the side chains may each be 10 or less, further 8 or less and further 6 or less. Note that when referring to the longest arrays of carbons as the main chains with the carbons of the hydrocarbon groups of $R^1$ and $R^2$ bonded to the oxygen atoms (O) in the formula as the first carbons, and representing the carbon numbers of the main chains as X (X is 3 or more because the carbon numbers of $R^1$ and $R^2$ are 5 or more), hydrocarbon groups bonded to any of the first carbons to the X-1 carbons in the main chains are each referred to as a side chain.

The hydrocarbon groups of $R^1$ and $R^2$ in the general formula (a1) may be either saturated or unsaturated.

The hydrocarbon groups of $R^1$ and $R^2$ in the general formula (a1) more preferably include a saturated branched hydrocarbon group from the viewpoint of ease of removal of laundry or the like.

Further, the hydrocarbon groups of $R^1$ and $R^2$ may be a group derived from a Guerbet alcohol from the viewpoints of ease of removal of laundry or the like and availability.

$R^1$ and $R^2$ in the general formula (a1) each independently represent preferably a branched alkyl group with 8 or more and 12 or less carbons, more preferably a branched alkyl group with 10 or more and 12 or less carbons and further preferably a branched alkyl group with 10 carbons from the viewpoint of ease of removal of laundry or the like.

In the present invention, an open-chain branched hydrocarbon group such as a branched alkyl group or the like includes a hydrocarbon residue left after the removal of a hydroxyl group from a secondary alcohol.

When $R^1$ and $R^2$ each represent a branched alkyl group with 8 or more and 12 or less carbons, the total numbers of carbons constituting their side chains may be the same or different, and are preferably 1 or more and more preferably 2 or more, and preferably 4 or less, more preferably 3 or less and further preferably 3 from the viewpoint of ease of removal of laundry or the like.

In the present invention, the total number of carbons constituting side chains refers to the total of the carbon numbers of all the side chains other than the main chain in one branched alkyl group, and when there is a plurality of side chains, it refers to the total of the carbon numbers of all those side chains.

$R^1$ and $R^2$ may have the same number or different numbers of side chains, and have 1 or more, and preferably 3 or less and more preferably 2 or less side chains from the viewpoint of ease of removal of laundry or the like. The numbers of side chains in $R^1$ and $R^2$ are each preferably 1 from the viewpoint of ease of removal of laundry or the like.

In the present invention, the number of side chains refers to the number of side chains branching off from the main chain, and even if the side chain further has a side chain branching off from the side chain, the number of side chains remains the same. However, while the side chain may further have a side chain branching off from the side chain, the side chain is preferably a straight chain from the viewpoint of ease of removal of laundry or the like.

When $R^1$ and $R^2$ each independently represent a branched alkyl group with 8 or more and 12 or less carbons, $R^1$ and $R^2$ may have the same number or different numbers of branch carbons, and have 1 or more, and preferably 3 or less and more preferably 2 or less branch carbons from the viewpoint of ease of removal of laundry or the like. The numbers of branch carbons in $R^1$ and $R^2$ are each preferably 1 from the viewpoint of ease of removal of laundry or the like. In the present invention, the number of branch carbons refers to the total of the number of tertiary carbon atoms and the number of quaternary carbon atoms in a branched alkyl group.

More preferable aspects of $R^1$ and $R^2$ are branched alkyl groups with 8 or more and 12 or less carbons, wherein the carbon numbers of the main chains are each independently 6 or more and 8 or less, the numbers of carbons constituting the side chains are each independently preferably 1 or more and more preferably 2 or more, and preferably 4 or less, more preferably 3 or less and further 3, and the numbers of side chains are each independently preferably 3 or less, more preferably 2 or less and further preferably 1 from the viewpoint of ease of removal of laundry or the like.

$R^1$ and $R^2$ each represent preferably a branched alkyl group selected from a branched octyl group, a branched decyl group and a branched dodecyl group from the viewpoint of ease of removal of laundry or the like, and more preferably a branched decyl group from the viewpoint of ease of removal of laundry or the like. Examples of the branched octyl group include 2-ethylhexyl group or the like. Examples of the branched decyl group include 2-propylheptyl group, a group derived from a decyl alcohol manufactured by KH Neochem Co., Ltd. or the like, and 2-propylheptyl group is preferable. Examples of the branched dodecyl group include 2-butyloctyl group or the like.

The hydrocarbon groups of $R^1$ and $R^2$ in the general formula (a1) may be the same or different. The case where the hydrocarbon groups of $R^1$ and $R^2$ are different is preferable from the viewpoint of ease of removal of laundry or the like. Further, the case where the hydrocarbon groups of $R^1$ and $R^2$ are the same is preferable from the viewpoints of ease of removal of laundry or the like and quality stability. For example, $R^1$ and $R^2$ in the general formula (a1) may have the same number or different numbers of carbons. The case where $R^1$ and $R^2$ have different numbers of carbons is preferable from the viewpoint of ease of removal of laundry or the like. Further, the case where $R^1$ and $R^2$ have the same number of carbons is preferable from the viewpoints of ease of removal of laundry or the like and quality stability.

The hydrocarbon groups of $R^1$ and $R^2$ in the general formula (a1) have a degree of branching defined by the following formula of preferably 0.3 or less, more preferably 0.2 or less, further preferably 0.1 or less and furthermore preferably 0.08 or less from the viewpoint of ease of removal of laundry or the like, and preferably 0.01 or more, more preferably 0.02 or more and further preferably 0.04 or more from the viewpoint of ease of removal of laundry or the like.

Degree of branching=[(total number of terminal methyl groups in $R^1$ and $R^2$)−2]/(total number of carbons in $R^1$ and $R^2$)

Note that the degree of branching is an average value that can be measured with $^1$H-NMR.

$A^1O$ and $A^2O$ in the general formula (a1) each represent an alkyleneoxy group with 2 or more and 4 or less carbons, and preferably with 2 or 3 carbons from the viewpoint of ease of removal of laundry or the like. x1 and x2 in the general formula (a1) represent the average numbers of added moles of $A^1O$ and $A^2O$, and each represent a number of 0 or more and 10 or less, and from the viewpoint of ease of removal of laundry or the like, preferably 6 or less, more preferably 4 or less and further preferably 2 or less, and furthermore preferably 0.

M in the general formula (a1) represents a cation. M represents preferably a cation other than a hydrogen ion. Examples of M include, for example, alkali metal ions such as a lithium ion, a sodium ion, a potassium ion or the like, alkaline earth metal ions such as a magnesium ion, a calcium ion, a barium ion or the like, organic ammonium ions such as a triethanolammonium ion, a diethanolammonium ion, a monoethanolammonium ion, a trimethylammonium ion, a monomethylammonium ion or the like, and others.

M represents preferably an alkali metal ion or an alkanol ammonium ion, more preferably a sodium ion, a potassium ion, a triethanolammonium ion, a diethanolammonium ion or a monoethanolammonium ion and further preferably a sodium ion from the viewpoint of ease of removal of laundry or the like.

Component (b) is one or more surfactants selected from components (b1) and (b2) (excluding component (a)). Component (b) is preferably component (b2) from the viewpoint of washing performance.

Component (b1) is an anionic surfactant (excluding component (a)). Component (b1) is preferably one or more compounds selected from compound (b1-1) represented by the following general formula (b1-1) [hereinafter referred to as component (b1-1)], compound (b1-2) represented by the following general formula (b1-2) [hereinafter referred to as component (b1-2)] and compound (b1-3) represented by the following general formula (b1-3) [hereinafter referred to as component (b1-3)]. Component (b1) is preferably component (b1-1) from the viewpoint of washing performance, and preferably component (b1-2) from the viewpoint of ease of removal of laundry or the like.

$$R^{1b}—O—[(PO)_m(EO)_n]—SO_3M \quad (b1\text{-}1)$$

wherein in the formula (b1-1), $R^{1b}$ represents an alkyl group with 8 or more and 22 or less carbons, in which a carbon atom bonded to the oxygen atom is a primary carbon atom, PO represents a propyleneoxy group, EO represents an ethyleneoxy group, PO and EO are bonded in blocks or bonded at random, PO and EO are bonded in arbitrary order, m and n represent an average number of added moles, and m is 0 or more and 5 or less and n is 0 or more and 16 or less, and M represents a hydrogen atom, an alkali metal, an alkaline earth metal (½ atom), ammonium or an organic ammonium.

$$R^{2b}—B—SO_3M \quad (b1\text{-}2)$$

wherein in the formula (b1-2), $R^{2b}$ represents an alkyl group with 9 or more and 21 or less carbons, B represents a benzene ring, a carbon atom of $R^{2b}$ bonded to a carbon atom of B is a secondary carbon atom, M represents a hydrogen atom, an alkali metal, an alkaline earth metal (½ atom), ammonium or an organic ammonium, and a sulfonic acid group is bonded in an ortho, meta or para position relative to $R^{2b}$ bonded to B.

$$R^{3b}—CH(SO_3M)COOR^{4b} \quad (b1\text{-}3)$$

wherein in the formula (b1-3), $R^{3b}$ represents an alkyl group with 6 or more and 20 or less carbons, $R^{4b}$ represents an alkyl group with 1 or more and 6 or less carbons, and M represents a hydrogen atom, an alkali metal, an alkaline earth metal (½ atom), ammonium or an organic ammonium.

$R^{1b}$ in the general formula (b1-1) represents an alkyl group with preferably 9 or more, more preferably 10 or more and further preferably 12 or more, and preferably 18 or less, more preferably 16 or less and further preferably 14 or less carbons from the viewpoint of washing performance. $R^{1b}$ represents preferably a straight alkyl group.

m in the general formula (b1-1) is preferably 4 or less and more preferably 3 or less from the viewpoint of washing performance.

n in the general formula (b1-1) is preferably 0.5 or more and more preferably 1 or more, and preferably 10 or less, more preferably 5 or less and further preferably 4 or less from the viewpoint of washing performance.

M in the general formula (b1-1) represents preferably a hydrogen atom, an alkali metal such as sodium, potassium or the like, an alkaline earth metal (½ atom) such as magnesium, calcium or the like, or an organic ammonium. A salt of the organic ammonium may be a salt of an amine used as a pH adjuster. M represents more preferably an alkali metal such as sodium, potassium or the like or an alkanol ammonium such as monoethanolammonium, diethanolammonium or the like and further preferably sodium from the viewpoint of washing performance.

Component (b1-1) is preferably a polyoxyalkylene alkyl ether sulfate sodium salt in which the alkyl group has 12 or more and 14 or less carbons, the average number of added moles of a propyleneoxy group is 0 or more and 4 or less, and the average number of added moles of an ethyleneoxy group is 1 or more and 4 or less from the viewpoint of washing performance. In other words, component (b1-1) is preferably a compound of the general formula (b1-1) in which $R^{1b}$ represents an alkyl group with 12 or more and 14 or less carbons, m is 0 or more and 4 or less, n is 1 or more and 4 or less, and M represents sodium.

$R^{2b}$ in the general formula (b1-2) represents an alkyl group with 9 or more, preferably 10 or more and more preferably 11 or more, and preferably 18 or less, more preferably 16 or less and further preferably 14 or less carbons from the viewpoint of ease of removal of laundry or the like.

M in the general formula (b1-2) represents preferably a hydrogen atom, an alkali metal such as sodium, potassium or the like, an alkaline earth metal (½ atom) such as magnesium, calcium or the like, or an organic ammonium. A salt of the organic ammonium may be a salt of an amine used as a pH adjuster. M represents more preferably an alkali metal such as sodium, potassium or the like or an alkanol ammonium such as monoethanolammonium, diethanolammonium or the like and further preferably sodium from the viewpoint of ease of removal of laundry or the like.

Component (b1-2) is preferably an alkyl benzene sulfonate in which the alkyl group has 11 or more and 14 or less carbons and more preferably an alkyl benzene sulfonate sodium salt in which the alkyl group has 11 or more and 14 or less carbons from the viewpoint of ease of removal of laundry or the like. In other words, component (b1-2) is preferably a compound of the general formula (b1-2) in which $R^{2b}$ represents an alkyl group with 11 or more and 14 or less carbons, and M represents sodium.

$R^{3b}$ in the general formula (b1-3) represents an alkyl group with preferably 8 or more and more preferably 10 or more, and preferably 18 or less and more preferably 16 or less carbons from the viewpoints of washing performance and ease of removal of laundry or the like.

$R^{4b}$ in the general formula (b1-3) represents an alkyl group with preferably 1 or more, and preferably 5 or less and more preferably 4 or less carbons from the viewpoints of washing performance and ease of removal of laundry or the like.

M in the general formula (b1-3) represents preferably a hydrogen atom, an alkali metal such as sodium, potassium or the like, an alkaline earth metal (½ atom) such as magnesium, calcium or the like, or an organic ammonium salt from the viewpoints of washing performance and ease of removal of laundry or the like. The organic ammonium salt may be a salt of an amine used as a pH adjuster. M represents more preferably an alkali metal such as sodium, potassium or the like or an alkanol ammonium such as monoethanolammonium, diethanolammonium or the like and further preferably sodium.

Component (b1-3) is preferably a compound of the general formula (b1-3) in which $R^{3b}$ represents an alkyl group with 11 or more and 14 or less carbons, $R^{4b}$ represents an alkyl group with 1 or more and 5 or less carbons, and M represents sodium from the viewpoints of washing performance and ease of removal of laundry or the like.

Component (b2) is one or more nonionic surfactants selected from an aliphatic alcohol alkoxylate and an ester alkoxylate.

A nonionic surfactant represented by the following general formula (b2) can be preferably used as component (b2) from the viewpoints of washing performance and ease of removal of laundry or the like:

$$R^{5b}\text{—}(CO)_m O\text{-}(AO)_n\text{—}R^{6b} \quad \text{(b2)}$$

wherein $R^{5b}$ represents an aliphatic hydrocarbon group with 9 or more and 18 or less carbons; $R^{6b}$ represents a hydrogen atom or a methyl group; CO represents a carbonyl group; m represents a number of 0 or 1; AO represents one or more alkyleneoxy groups selected from an alkyleneoxy group with 2 carbons and an alkyleneoxy group with 3 carbons; when AO includes an ethyleneoxy group and a propyleneoxy group, the ethyleneoxy group and the propyleneoxy group may be bonded in blocks or bonded at random; and n represents an average number of added moles, and represents a number of 1 or more and 70 or less.

$R^{5b}$ has preferably 9 or more, more preferably 10 or more and further preferably 12 or more, and preferably 18 or less, more preferably 16 or less and further preferably 14 or less carbons from the viewpoints of washing performance and ease of removal of laundry or the like.

$R^{6b}$ represents a hydrogen atom or a methyl group. $R^{6b}$ represents preferably a methyl group from the viewpoint of ease of removal of laundry or the like, or preferably a hydrogen atom from the viewpoint of washing performance.

m in the general formula (b2) represents a number of 0 or 1. m is preferably 1 from the viewpoint of ease of removal of laundry or the like, and preferably 0 from the viewpoint of washing performance. $R^{6b}$ is preferably a methyl group when m is 1.

AO represents one or more alkyleneoxy groups selected from an alkyleneoxy group with 2 carbons and an alkyleneoxy group with 3 carbons. When AO includes an ethyleneoxy group and a propyleneoxy group, the ethyleneoxy group and the propyleneoxy group may be bonded in blocks or bonded at random. Further, the ethyleneoxy group and the propyleneoxy group are bonded in arbitrary order.

n in the general formula (b2) represents an average number of added moles, and preferably 1 or more, more preferably 5 or more, further preferably 10 or more and furthermore preferably 15 or more, and preferably 70 or less, more preferably 50 or less, further preferably 40 or less, furthermore preferably 30 or less and furthermore preferably 20 or less from the viewpoints of washing performance and ease of removal of laundry or the like.

A more preferable compound as the nonionic surfactant of component (b2) of the present invention is a polyoxyethylene (polyoxypropylene) alkyl ether in which the average degree of polymerization (or sometimes also referred to as the average number of added moles) of the ethyleneoxy group (hereinafter sometimes referred to as EO group) is preferably 3 or more, more preferably 5 or more, further preferably 10 or more and furthermore preferably 15 or more from the viewpoints of washing performance and ease of removal of laundry or the like, and preferably 50 or less, more preferably 25 or less and further preferably 20 or less from the viewpoint of washing performance, the average degree of polymerization (or sometimes also referred to as the average number of added moles) of the propyleneoxy group (hereinafter sometimes also referred to as PO group) is preferably 0 or more, and preferably 5 or less and more preferably 3 or less from the viewpoint of ease of removal of laundry or the like, EO group and PO group may be bonded at random or bonded in blocks, preferably bonded in blocks and more preferably bonded in blocks in the order of EOPOEO or the order of POEO with respect to the alkyl ether (for example, $R^{5b}$—O in the general formula (b2)) from the viewpoints of washing performance and ease of removal of laundry or the like, and the alkyl group is derived from a straight primary or secondary alcohol with preferably 12 or more, and preferably 18 or less, more preferably 14 or less and further preferably 12 carbons.

The detergent composition for fibers of the present invention contains component (a) in an amount of preferably 1 mass % or more, more preferably 5 mass % or more and further preferably 8 mass % or more from the viewpoint of ease of removal of laundry or the like, and preferably 80 mass % or less, more preferably 60 mass % or less, further preferably 50 mass % or less, furthermore preferably 40 mass % or less, furthermore preferably 30 mass % or less, furthermore preferably 20 mass % or less and furthermore preferably 14 mass % or less from the viewpoint of washing performance. Note that the content of component (a) in the present invention is calculated by assuming that the component is a sodium salt.

The detergent composition for fibers of the present invention contains component (b) in an amount of preferably 1 mass % or more, more preferably 5 mass % or more, further preferably 10 mass % or more and furthermore preferably 12 mass % or more from the viewpoint of washing performance, and preferably 80 mass % or less, more preferably 60 mass % or less, further preferably 50 mass % or less, furthermore preferably 40 mass % or less, furthermore preferably 30 mass, or less, furthermore preferably 20 mass % or less and furthermore preferably 14 mass % or less from the viewpoint of ease of removal of laundry.

The proportion of the content of component (a) to the total content of components (a) and (b1) in the detergent composition for fibers of the present invention is preferably 35 mass % or more from the viewpoint of ease of removal of laundry or the like, and preferably 80 mass or less, more preferably 70 mass % or less, further preferably 65 mass, or less, furthermore preferably 60 mass or less, furthermore preferably 50 mass % or less and furthermore preferably 40 mass % or less from the viewpoint of washing performance. These proportions can be applied to requirement (1). In the present invention, a proportion expressed as a mass percentage is a predetermined proportion value expressed as a percentage (the same applies hereinafter).

The proportion of the content of component (a) to the total content of components (a) and (b2) in the detergent composition for fibers of the present invention is preferably 50 mass % or more from the viewpoint of ease of removal of laundry or the like, and preferably 80 mass % or less, more preferably 70 mass % or less, further preferably 65 mass % or less and furthermore preferably 60 mass % or less from the viewpoint of washing performance. These proportions can be applied to requirement (2).

When the detergent composition for fibers of the present invention includes components (b1) and (b2), it is sufficient if at least one of the proportion of the content of component (a) to the total content of components (a) and (b1) and the proportion of the content of component (a) to the total content of components (a) and (b2) falls within the above range. When the detergent composition for fibers of the present invention includes components (b1) and (b2), it is preferable that both the proportion of the content of component (a) to the total content of components (a) and (b1) and the proportion of the content of component (a) to the total content of components (a) and (b2) fall within the above ranges.

When the detergent composition for fibers of the present invention includes components (b1) and (b2), the proportion of component (b1) to component (b2) by mass ratio is preferably 0.01 or more, more preferably 0.1 or more and further preferably 0.2 or more from the viewpoint of washing performance, and preferably 1 or less, more preferably 0.9 or less, further preferably 0.8 or less, furthermore preferably 0.7 or less, furthermore preferably 0.6 or less and furthermore preferably 0.5 or less from the viewpoint of ease of removal of laundry or the like. This proportion is the mass ratio (b1)/(b2).

The detergent composition for fibers of the present invention can also contain a surfactant other than components (a) and (b) [hereinafter referred to as component (x)].

Examples of (x) include one or more surfactants selected from nonionic surfactants other than component (b2), cationic surfactants and amphoteric surfactants.

Examples of the nonionic surfactants other than component (b2) include polyethylene glycol type nonionic surfactants such as polyoxyethylene sorbitan fatty acid esters, polyoxyethylene sorbitol fatty acid esters, polyoxyethylene glycerin fatty acid esters, polyoxyethylene alkyl phenyl ethers, polyoxyalkylene (hardened) castor oil or the like, polyhydric alcohol type nonionic surfactants such as sucrose fatty acid esters, polyglycerin alkyl ethers, polyglycerin fatty acid esters, alkyl glycosides or the like, and fatty acid alkanol amides.

Examples of the cationic surfactants include cationic surfactants that are tertiary amine salts and cationic surfactants that are quaternary ammonium salts.

Examples of the amphoteric surfactants include betaine-based amphoteric surfactants and amine oxide-type amphoteric surfactants.

Examples of the betaine-based amphoteric surfactants include the following: alkyl imidazolium betaines such as 2-alkyl-N-carboxymethyl-N-hydroxyethyl imidazolinium betaines such as 2-lauryl-N-carboxymethyl-N-hydroxyethyl imidazolinium betaine, 2-myristyl-N-carboxymethyl-N-hydroxyethyl imidazolinium betaine or the like and others; alkyl dimethylaminoacetic acid betaines such as lauryl dimethylaminoacetic acid betaine, myristyl dimethylaminoacetic acid betaine, stearyl dimethylaminoacetic acid betaine and others; fatty acid amidopropyl betaines such as lauric acid amidopropyl betaine, myristic acid amidopropyl betaine, coconut oil fatty acid amidopropyl betaine and others; and hydroxysulfobetaines such as alkyl hydroxysulfobetaines such as lauryl hydroxysulfobetaine, coconut oil hydroxysulfobetaine or the like, fatty acid amidopropyl hydroxysulfobetaines such as lauric acid amidopropyl hydroxysulfobetaine, coconut oil fatty acid amidopropyl hydroxysulfobetaine or the like and others, etc.

Examples of the amine oxide-type amphoteric surfactants include alkyldimethylamine oxides such as octyldimethylamine oxide, lauryldimethylamine oxide, myristyldimethylamine oxide or the like.

Component (x) is preferably one or more surfactants selected from the nonionic surfactants other than component (b2).

When the detergent composition for fibers of the present invention contains component (x), the composition contains component (x) in an amount of preferably 0.1 mass % or more and more preferably 0.5 mass % or more, and preferably 30 mass % or less and more preferably 20 mass % or less.

The proportion of the total amount of components (a) and (b) to the total amount of surfactants in the detergent composition for fibers of the present invention may be, for example, 10 mass % or more, further 20 mass % or more, further 30 mass % or more and further 40 mass % or more, and 100 mass % or less, further 90 mass % or less, further 80 mass % or less, further 70 mass % or less, further 60 mass % or less and further 50 mass % or less from the viewpoints of washing performance and ease of removal of laundry or the like. This proportion may be 100 mass %. The total amount of surfactants in the present invention may be the total content of components (a), (b) and (x) in the composition. The detergent composition for fibers of the present invention may be a composition containing a surfactant, wherein the composition contains as the surfactant components (a) and (b) at the predetermined proportions, and the proportion of the total content of components (a) and (b) to the content of surfactants falls within the above range.

From the viewpoint of improving solubility to attain washing performance and ease of removal of laundry or the like, the detergent composition for fibers of the present invention preferably further contains the following component (c):

component (c): a solvent having a hydroxyl group.

Component (c) is preferably one or more organic solvents selected from the following components (c1) to (c4):

- component (c1): a monohydric alcohol with 2 or more and 6 or less carbons;
- component (c2): a dihydric or more and dodecahydric or less alcohol with 2 or more and 12 or less carbons;
- component (c3): an organic solvent having a hydrocarbon group with 1 or more and 8 or less carbons (excluding an aromatic group that may be partially substituted), an ether group and a hydroxyl group; and
- component (c4): an organic solvent having an aromatic group that may be partially substituted, an ether group and a hydroxyl group.

Examples of component (c1) include, for example, ethanol, 1-propanol, 2-propanol and phenol.

Examples of component (c2) include, for example, ethylene glycol, propylene glycol, butylene glycol, hexylene glycol, diethylene glycol, triethylene glycol, tetraethylene glycol, dipropylene glycol, tripropylene glycol and glycerin.

Examples of component (c3) include, for example, diethylene glycol monomethyl ether, triethylene glycol monomethyl ether, diethylene glycol monoethyl ether, diethylene glycol monobutyl ether (which is also referred to as butyldiglycol), dipropylene glycol monomethyl ether, dipropylene glycol monoethyl ether, tripropylene glycol monomethyl ether, 1-methoxy-2-propanol, 1-ethoxy-2-propanol, 1-methylglycerin ether, 2-methylglycerin ether, 1,3-dimethylglycerin ether, 1-ethylglycerin ether, 1,3-diethylglycerin ether, 1-pentylglyceryl ether, 2-pentylglyceryl ether, 1-octylglyceryl ether and 2-ethylhexylglyceryl ether.

Examples of component (c4) include, for example, 2-phenoxyethanol, diethylene glycol monophenyl ether, triethylene glycol monophenyl ether, a polyethylene glycol monophenyl ether of an average molar weight of about 480, 2-benzyloxyethanol and diethylene glycol monobenzyl ether.

Component (c) is preferably one or more organic solvents having a hydroxyl group selected from components (c2), (c3) and (c4) and more preferably one or more organic solvents having a hydroxyl group selected from components (c2) and (c3) from the viewpoints of washing performance and ease of removal of laundry or the like.

When the detergent composition for fibers of the present invention contains component (c), the composition contains component (c) in an amount of preferably 0.1 mass or more, more preferably 1 mass % or more and further preferably 10 mass % or more, and preferably 60 mass % or less, more preferably 50 mass % or less and further preferably 25 mass % or less from the viewpoint of improving solubility to attain washing performance and ease of removal of laundry or the like.

When the detergent composition for fibers of the present invention contains component (c), the proportion of component (c) to component (a) by mass ratio, (c)/(a), is preferably 5.0 or less, more preferably 3.0 or less and further preferably 1.0 or less from the viewpoint of ease of removal of laundry or the like, and preferably 0.6 or more from the viewpoint of washing performance.

The detergent composition for fibers of the present invention can contain, as a further optional component, for example, a pH adjuster, a fragrance, an anti-bacterial agent, a bleaching agent, a bleach activator, a defoamer, a fragrance capsule, an enzyme, a polymer, silicone or the like. As the pH adjuster, for example, an alkali agent such as monoethanolamine or the like or an acid agent such as citric acid or the like can be used.

The detergent composition for fibers of the present invention preferably contains water. The composition may be a liquid composition containing water. Water that has been moderately purified and includes no impurities is preferably used as the water. Well water or industrial water can also be used. The water is preferably tap water or purified water, for example, ion exchange water. The detergent composition for fibers of the present invention contains water in an amount of preferably 50 mass or more, more preferably 60 mass % or more and further preferably 70 mass % or more, and preferably 95 mass % or less, preferably 90 mass % or less and more preferably 85 mass % or less. The content of water may be the balance of the composition excluding the total content of components (a) and (b) and an optional component.

The pH at 25° C. of the detergent composition for fibers of the present invention measured by the following measurement method is preferably 4 or more and more preferably 5 or more, and preferably 12 or less and more preferably 11 or less.

[pH Measurement Method]

A composite electrode for pH measurements (manufactured by HORIBA, Ltd., glass slide-in sleeve type) is connected to a pH meter (manufactured by HORIBA, Ltd., pH/ion meter F-23), and the power is turned on. As the internal solution of the pH electrode, a saturated aqueous potassium chloride solution (3.33 mol/L) is used. Next, 100-mL beakers are respectively filled with a pH 4.01 standard solution (phthalate standard solution), a pH 6.86 standard solution (neutral phosphate standard solution) and a pH 9.18 standard solution (borate standard solution), and immersed in a constant temperature bath at 25° C. for 30 minutes. The electrode for pH measurements is immersed in the standard solutions adjusted to the constant temperature for 3 minutes to perform a calibration operation in the order of pH 6.86, pH 9.18 and pH 4.01. A sample to be measured (liquid detergent composition for fibers) is adjusted to 25° C., the electrode of the pH meter is immersed in the sample, and the pH 1 minute later is measured.

<Method for Treating Textile Product>

The present invention relates to a method for treating a textile product including, washing the textile product with a washing liquid obtained by mixing components (a) and (b) with water, and thereafter rinsing the textile product with water, wherein the washing liquid satisfies at least one of the following requirements (1) and (2), requirement (1): a proportion of a content of component (a) to a total content of components (a) and (b1) in the washing liquid is 35 mass % or more and 80 mass % or less, and requirement (2): a proportion of the content of component (a) to a total content of components (a) and (b2) in the washing liquid is 50 mass % or more and 80 mass % or less.

The matters stated in the detergent composition for fibers of the present invention can be appropriately applied to the method for treating a textile product of the present invention. The specific examples, preferable aspects or the like of components (a), (b), (b1) and (b2) or the like are also the same. Further, the washing liquid can also contain an optional component such as component (x), component (c) or the like. The textile product can be washed and rinsed in conformance with publicly-known methods. The detergent composition for fibers of the present invention can be used in the method for treating a textile product of the present invention. The washing liquid may be a liquid obtained by mixing the detergent composition for fibers of the present invention with water.

The concentration of component (a) in the washing liquid in the method for treating a textile product of the present invention is preferably 0.0001 mass % or more and more preferably 0.0005 mass % or more from the viewpoint of ease of removal of laundry or the like, and preferably 10 mass % or less and more preferably 1 mass % or less from the viewpoint of washing performance. The detergent composition for fibers of the present invention is preferably diluted with water such that the content of component (a) falls within this range to prepare the washing liquid. A specific dilution ratio may be preferably 500 times or more and more preferably 800 times or more, and preferably 5000 times or less and more preferably 3000 times or less from the viewpoint of workability during washing.

The method for treating a textile product of the present invention can be carried out by using, for example, a washing machine for home use or a washing machine for commercial use. As conditions therefor, commonly used temperature, time, bath ratio or the like can be employed. The method for treating a textile product of the present invention can reduce friction applied to textile products during washing and during dehydration. This makes it easier to remove textile products after washing. Further, washing damage to textile products is reduced, and wrinkles in textile products at the end of washing are reduced.

In addition to the above embodiments, the present invention discloses the aspects below.

<1>

A detergent composition for fibers containing the following components (a) and (b), component (a): a sulfosuccinic acid ester or a salt thereof having a branched hydrocarbon group with 5 or more and 18 or less carbons, and component (b): one or more surfactants selected from the following components (b1) and (b2) (excluding component (a)), component (b1): an anionic surfactant, and component (b2): one or more nonionic surfactants selected from an aliphatic alcohol alkoxylate and an ester alkoxylate, wherein the composition satisfies at least one of the following requirements (1) and (2), requirement (1): a proportion of a content of component (a) to a total content of components (a) and (b1) is 35 mass % or more and 80 mass % or less, and requirement (2): a proportion of the content of component (a) to a total content of components (a) and (b2) is 50 mass % or more and 80 mass % or less.

<2>

The detergent composition for fibers according to <1>, wherein component (a) is a sulfosuccinic acid diester or a salt thereof having two branched hydrocarbon groups with 5 or more and 18 or less carbons.

<3>

The detergent composition for fibers according to <1> or <2>, wherein component (a) is a sulfosuccinic acid diester or a salt thereof having two branched hydrocarbon groups with 5 or more and 18 or less carbons, the two hydrocarbon groups having 20 or more carbons in total.

<4>

The detergent composition for fibers according to any of <1> to <3>, wherein component (a) is a compound represented by the following general formula (a1):

(a1)

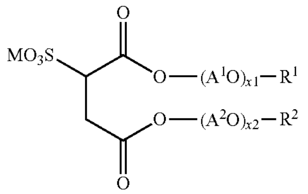

wherein $R^1$ and $R^2$ each represent a branched hydrocarbon group with 5 or more and 18 or less carbons, $A^1O$ and $A^2O$ each represent an alkyleneoxy group with 2 or more and 4 or less carbons, x1 and x2 represent an average number of added moles, and each represent a number of 0 or more and 10 or less, and M represents a cation.

<5>

The detergent composition for fibers according to <4>, wherein the hydrocarbon groups of $R^1$ and $R^2$ in the general formula (a1) are an alkyl group or an alkenyl group.

<6>

The detergent composition for fibers according to <4> or <5>, wherein the carbon numbers of the hydrocarbon groups of $R^1$ and $R^2$ in the general formula (a1) are preferably 6 or more, more preferably 8 or more and further preferably 10 or more, and preferably 15 or less and more preferably 12 or less.

<7>

The detergent composition for fibers according to any of <4> to <6>, wherein the branched hydrocarbon groups of $R^1$ and $R^2$ in the general formula (a1) have a side chain with preferably 2 or more and more preferably 3 or more, and preferably 10 or less, more preferably 8 or less and further preferably 6 or less carbons, and $R^1$ and $R^2$ in the general formula (a1) represent preferably a branched alkyl group with 8 or more and 12 or less carbons, more preferably a branched alkyl group with 10 or more and 12 or less carbons and further preferably a branched alkyl group with 10 carbons.

<8>

The detergent composition for fibers according to any of <4> to <7>, wherein $R^1$ and $R^2$ in the general formula (a1) each represent preferably a group selected from 2-ethylhexyl group and 2-propylheptyl group and more preferably 2-propylheptyl group.

<9>

The detergent composition for fibers according to any of <4> to <8>, wherein $A^1O$ and $A^2O$ in the general formula (a1) each represent an alkyleneoxy group with 2 or more and 4 or less carbons and preferably with 2 or 3 carbons, and x1 and x2 in the general formula (a1) represent the average numbers of added moles of $A^1O$ and $A^2O$, and each represent a number of 0 or more and 10 or less, preferably 6 or less, more preferably 4 or less and further preferably 2 or less, and furthermore preferably 0.

<10>

The detergent composition for fibers according to any of <4> to <9>, wherein M in the general formula (a1) represents preferably an alkali metal ion or an alkanol ammonium ion, more preferably a sodium ion, a potassium ion, a triethanolammonium ion, a diethanolammonium ion or a monoethanolammonium ion and further preferably a sodium ion.

<11>

The detergent composition for fibers according to any of <1> to <10>, wherein component (b1) is one or more compounds selected from compound (b1-1) represented by the following general formula (b1-1) [hereinafter referred to as component (b1-1)], compound (b1-2) represented by the following general formula (b1-2) [hereinafter referred to as component (b1-2)] and compound (b1-3) represented by the following general formula (b1-3) [hereinafter referred to as component (b1-3)], $$R^{1b}—O—[(PO)_m(EO)_n]—SO_3M \quad (b1\text{-}1)$$

wherein in the formula (b1-1), $R^{1b}$ represents an alkyl group with 8 or more and 22 or less carbons, in which a carbon atom bonded to the oxygen atom is a primary carbon atom, PO represents a propyleneoxy group, EO represents an ethyleneoxy group, PO and EO are bonded in blocks or bonded at random, PO and EO are bonded in arbitrary order, m and n represent an average number of added moles, and m is 0 or more and 5 or less and n is 0 or more and 16 or less, and M represents a hydrogen atom, an alkali metal, an alkaline earth metal (½ atom), ammonium or an organic ammonium, $$R^{2b}—B—SO_3M \quad (b1\text{-}2)$$

wherein in the formula (b1-2), $R^{2b}$ represents an alkyl group with 9 or more and 21 or less carbons, B represents a benzene ring, a carbon atom of $R^{2b}$ bonded to a carbon atom of B is a secondary carbon atom, M represents a hydrogen atom, an alkali metal, an alkaline earth metal (½ atom), ammonium or an organic ammonium, and a sulfonic acid group is bonded in an ortho, meta or para position relative to $R^{2b}$ bonded to B, and $$R^{3b}—CH(SO_3M)COOR^{4b} \quad (b1\text{-}3)$$

wherein in the formula (b1-3), $R^{3b}$ represents an alkyl group with 6 or more and 20 or less carbons, $R^{4b}$ represents an alkyl group with 1 or more and 6 or less carbons, and M represents a hydrogen atom, an alkali metal, an alkaline earth metal (½ atom), ammonium or an organic ammonium.

<12>

The detergent composition for fibers according to <11>, wherein $R^{1b}$ in the general formula (b1-1) represents a straight alkyl group with preferably 9 or more, more preferably 10 or more and further preferably 12 or more, and preferably 18 or less, more preferably 16 or less and further preferably 14 or less carbons.

<13>

The detergent composition for fibers according to <11> or <12>, wherein m in the general formula (b1-1) is preferably 4 or less and more preferably 3 or less, and n in the general formula (b1-1) is preferably 0.5 or more and more preferably 1 or more, and preferably 10 or less, more preferably 5 or less and further preferably 4 or less.

<14>

The detergent composition for fibers according to any of <11> to <13>, wherein $R^{2b}$ in the general formula (b1-2) represents an alkyl group with preferably 10 or more and more preferably 11 or more, and preferably 18 or less, more preferably 16 or less and further preferably 14 or less carbons.

<15>

The detergent composition for fibers according to any of <11> to <14>, wherein $R^{3b}$ in the general formula (b1-3) represents an alkyl group with preferably 8 or more and more preferably 10 or more, and preferably 18 or less and more preferably 16 or less carbons.

<16>

The detergent composition for fibers according to any of <11> to <15>, wherein $R^{4b}$ in the general formula (b1-3) represents an alkyl group with preferably 1 or more, and preferably 5 or less and more preferably 4 or less carbons.

<17>

The detergent composition for fibers according to any of <11> to <16>, wherein M in the general formulae (b1-1) to (b1-3) represents preferably a hydrogen atom, an alkali metal such as sodium, potassium or the like, an alkaline earth metal (½ atom) such as magnesium, calcium or the like or an organic ammonium, more preferably an alkali metal such as sodium, potassium or the like or an alkanol ammonium such as monoethanolammonium, diethanolammonium or the like and further preferably sodium.

<18>

The detergent composition for fibers according to any of <11> to <17>, wherein in the general formula (b1-1), $R^{1b}$ represents an alkyl group with 12 or more and 14 or less carbons, m is 0 or more and 4 or less, n is 1 or more and 4 or less, and M represents sodium.

<19>

The detergent composition for fibers according to any of <11> to <18>, wherein in the general formula (b1-2), $R^{2b}$ represents an alkyl group with 11 or more and 14 or less carbons, and M represents sodium.

<20>

The detergent composition for fibers according to any of <11> to <19>, wherein in the general formula (b1-3), $R^{3b}$ represents an alkyl group with 11 or more and 14 or less carbons, $R^{4b}$ represents an alkyl group with 1 or more and 5 or less carbons, and M represents sodium.

<21>

The detergent composition for fibers according to any of <1> to <20>, wherein component (b2) is a nonionic surfactant represented by the following general formula (b2):

$$R^{5b}—(CO)_mO-(AO)_n—R^{6b} \quad (b2)$$

wherein $R^{5b}$ represents an aliphatic hydrocarbon group with 9 or more and 18 or less carbons; $R^{6b}$ represents a hydrogen atom or a methyl group; CO represents a carbonyl group; m represents a number of 0 or 1; AO represents one or more alkyleneoxy groups selected from an alkyleneoxy group with 2 carbons and an alkyleneoxy group with 3 carbons; when AO includes an ethyleneoxy group and a propyleneoxy group, the ethyleneoxy group and the propyleneoxy group may be bonded in blocks or bonded at random; and n represents an average number of added moles, and represents a number of 1 or more and 70 or less.

<22>

The detergent composition for fibers according to <21>, wherein $R^{5b}$ in the general formula (b2) has preferably 9 or more, more preferably 10 or more and further preferably 12 or more, and preferably 18 or less, more preferably 16 or less and further preferably 14 or less carbons.

<23>

The detergent composition for fibers according to <21> or <22>, wherein m in the general formula (b2) is 0.

<24>

The detergent composition for fibers according to <21> or <22>, wherein m in the general formula (b2) is 1.

<25>

The detergent composition for fibers according to any of <21> to <24>, wherein n in the general formula (b2) represents an average number of added moles, and preferably 1 or more, more preferably 5 or more, further preferably 10 or more and furthermore preferably 15 or more, and preferably 70 or less, more preferably 50 or less, further preferably 40 or less, furthermore preferably 30 or less and furthermore preferably 20 or less.

<26>

The detergent composition for fibers according to any of <21> to <25>, wherein the average number of added moles of the ethyleneoxy group (hereinafter sometimes referred to as EO group) in the general formula (b2) is preferably 3 or more, more preferably 5 or more, further preferably 10 or more and furthermore preferably 15 or more, and preferably 50 or less, more preferably 25 or less and further preferably 20 or less.

<27>

The detergent composition for fibers according to any of <21> to <26>, wherein the average number of added moles of the propyleneoxy group (hereinafter sometimes referred to as PO group) in the general formula (b2) is preferably 0 or more, and preferably 5 or less and more preferably 3 or less.

<28>

The detergent composition for fibers according to any of <21> to <27>, wherein component (b2) is a polyoxyethylene (polyoxypropylene) alkyl ether represented by the general formula (b2) in which AO includes EO and PO, EO and PO are bonded in blocks in the order of EOPOEO or the order of POEO with respect to $R^{5b}$—O, and $R^{5b}$ represents an alkyl group and further an alkyl group derived from a straight primary or secondary alcohol with preferably 12 or more, and preferably 18 or less, more preferably 14 or less and further preferably 12 carbons.

<29>

The detergent composition for fibers according to any of <1> to <28>, wherein the content of component (a) is preferably 1 mass or more, more preferably 5 mass % or more and further preferably 8 mass % or more, and preferably 80 mass % or less, more preferably 60 mass % or less, further preferably 50 mass % or less, furthermore preferably 40 mass % or less, furthermore preferably 30 mass % or less, furthermore preferably 20 mass % or less and furthermore preferably 14 mass, or less.

<30>

The detergent composition for fibers according to any of <1> to <29>, wherein the content of component (b) is preferably 1 mass % or more, more preferably 5 mass % or more, further preferably 10 mass % or more and furthermore preferably 12 mass % or more, and preferably 80 mass % or less, more preferably 60 mass % or less, further preferably 50 mass, or less, furthermore preferably 40 mass or less, furthermore preferably 30 mass % or less, furthermore preferably 20 mass, or less and furthermore preferably 14 mass % or less.

<31>

The detergent composition for fibers according to any of <1> to <30>, wherein the proportion of the content of component (a) to the total content of components (a) and (b1) is preferably 35 mass, or more, and preferably 80 mass % or less, more preferably 70 mass % or less, further preferably 65 mass or less, furthermore preferably 60 mass % or less, furthermore preferably 50 mass % or less and furthermore preferably 40 mass % or less.

<32>

The detergent composition for fibers according to any of <1> to <31>, wherein the proportion of the content of component (a) to the total content of components (a) and (b2) is preferably 50 mass or more, and preferably 80 mass % or less, more preferably 70 mass % or less, further preferably 65 mass % or less and furthermore preferably 60 mass % or less.

<33>

The detergent composition for fibers according to any of <1> to <32>, including components (b1) and (b2) as component (b), wherein a proportion of component (b1) to component (b2) by mass ratio, (b1)/(b2), is preferably 0.01 or more, more preferably 0.1 or more and further preferably 0.2 or more, and preferably 1 or less, more preferably 0.9 or less, further preferably 0.8 or less, furthermore preferably 0.7 or less, furthermore preferably 0.6 or less and furthermore preferably 0.5 or less.

<34>

The detergent composition for fibers according to any of <1> to <33>, further containing a solvent having a hydroxyl group as component (c).

<35>

The detergent composition for fibers according to <34>, wherein component (c) is one or more organic solvents selected from the following components (c1) to (c4):

component (c1): a monohydric alcohol with 2 or more and 6 or less carbons;

component (c2): a dihydric or more and dodecahydric or less alcohol with 2 or more and 12 or less carbons;

component (c3): an organic solvent having a hydrocarbon group with 1 or more and 8 or less carbons (excluding an aromatic group that may be partially substituted), an ether group and a hydroxyl group; and component (c4): an organic solvent having an aromatic group that may be partially substituted, an ether group and a hydroxyl group.

<36>

The detergent composition for fibers according to <34> or <35>, wherein a content of component (c) is preferably 0.1 mass % or more, more preferably 1 mass % or more and further preferably 10 mass % or more, and preferably 60 mass or less, more preferably 50 mass % or less and further preferably 25 mass % or less.

<37>

The detergent composition for fibers according to any of <34> to <36>, wherein a proportion of component (c) to component (a) by mass ratio, (c)/(a), is preferably 5.0 or less, more preferably 3.0 or less and further preferably 1.0 or less, and preferably 0.6 or more.

<38>

The detergent composition for fibers according to any of <1> to <37>, wherein requirement (1) is that the proportion of the content of component (a) to the total content of components (a) and (b1) is 35 mass % or more, and 80 mass % or less, preferably 70 mass % or less, more preferably 65 mass % or less, further preferably 60 mass % or less, furthermore preferably 50 mass % or less and furthermore preferably 40 mass % or less.

<39>

The detergent composition for fibers according to any of <1> to <38>, wherein requirement (1) is that the proportion of the content of component (a) to the total content of components (a) and (b2) is 50 mass % or more, and 80 mass % or less, preferably 70 mass % or less, more preferably 65 mass or less and further preferably 60 mass % or less.

<40>

A method for treating a textile product including, washing the textile product with a washing liquid obtained by mixing the following components (a) and (b) with water, and thereafter rinsing the textile product with water, component (a): a sulfosuccinic acid ester or a salt thereof having a branched hydrocarbon group with 5 or more and 18 or less carbons, and component (b): one or more surfactants selected from the following components (b1) and (b2) (excluding component (a)), component (b1): an anionic surfactant, and component (b2): one or more nonionic surfactants selected from an aliphatic alcohol alkoxylate and an ester alkoxylate, wherein the washing liquid satisfies at least one of the following requirements (1) and (2), requirement (1): a proportion of a content of component (a) to a total content of components (a) and (b1) in the washing liquid is 35 mass % or more and 80 mass % or less, and requirement (2): a proportion of the content of component (a) to a total content of components (a) and (b2) in the washing liquid is 50 mass % or more and 80 mass % or less.

<41>

The method for treating a textile product according to <40>, wherein the detergent composition for fibers according to any of <1> to <39> is used.

EXAMPLES

The components used in the examples and comparative examples are listed below.

Component (a)

Sodium di-2 ethylhexyl sulfosuccinate

Sodium bis-2-propylheptyl sulfosuccinate

Component (b)

Component (b1)

APES: a (polyoxypropylene) polyoxyethylene lauryl ether sulfate sodium salt in which the alkyl group is derived from lauryl alcohol, the average number of added moles of the propyleneoxy group is 2 mol, and the average number of added moles of the ethyleneoxy group is 2 mol LAS: a sodium alkyl benzene sulfonate (alkyl composition: C10/C11/C12/C13=11/29/34/26 (mass ratio), mass average carbon number=17.75)

Component (b2)

MEE: a fatty acid methyl ester ethoxylate (in which the fatty acid has 16 or more and 18 or less carbons and the average number of added moles of the ethyleneoxy group is 15 mol)

$C12/14EO_9PO_2EO_9$: a polyoxyethylene·polyoxypropylene·polyoxyethylene mixed alkyl ether (in which the polyoxyethylene group, the polyoxypropylene group and the polyoxyethylene group are bonded to the mixed alkyl group of an alkyl group with 12 carbons and an alkyl group with 14 carbons (7/3 by mass ratio) in this order, the average numbers of added moles of the oxyethylene groups are 9 mol and 9 mol, and the average number of added moles of the oxypropylene group is 2 mol)

$C12/14EO_{10}$: a polyoxyethylene mixed alkyl ether (in which the polyoxyethylene group is bonded to the mixed alkyl group of an alkyl group with 12 carbons and an alkyl group with 14 carbons (7/3 by mass ratio), and the average number of added moles of the oxyethylene group is 10 mol)

$C12/14PO_{3.7}EO_{16.5}$: a polyoxypropylene polyoxyethylene mixed alkyl ether (in which the polyoxypropylene group and the polyoxyethylene group are bonded to the mixed alkyl group of an alkyl group with 12 carbons and an alkyl group with 14 carbons (7/3 by mass ratio) in this order, the average number of added moles of the oxyethylene group is 16.5 mol, and the average number of added moles of the oxypropylene group is 3.7 mol)

Component (c)

Propylene glycol

Butyldiglycol

Examples and Comparative Examples

The liquid detergent compositions for fibers shown in Tables 1 to 6 were prepared in the following manner and evaluated for the items below. The results are shown in Tables 1 to 6.

[Preparation of Composition]

A Teflon® stirrer piece with a length of 5 cm was placed in a glass beaker with a capacity of 200 mL, and the mass of them was measured. Next, 20 g of ion exchange water at 25° C., component (c), then component (b), and then component (a), were placed in the beaker in this order, and the top of the beaker was sealed with Saran Wrap®. The beaker having the contents therein was put in a water bath at 60° C. set on a magnetic stirrer, and the contents were stirred at 100 r/min for 30 minutes while keeping the temperature of water in the water bath in the temperature range of 60±2° C. After that, the pH of the contents was adjusted to a pH of 7 with an alkali agent (monoethanolamine) or an acid agent (citric acid). The pH measurements were made by the pH measurement method described earlier. Next, water in the water bath was replaced with tap water at 5° C., and the composition in the beaker was cooled to a temperature of 25° C. and then stirred for 10 minutes. Next, Saran Wrap® was removed and ion exchange water was added such that the mass of the contents reached 200 g, and the contents were stirred again at 100 r/min for 5 minutes, thus obtaining the liquid detergent compositions for fibers listed in Tables 1 to 6.

[Method for Evaluating Washing Performance]

(1) Preparation of Model Sebum Artificial Stain Cloth

A model sebum artificial stain liquid of the composition shown below was adhered to cloth to prepare model sebum artificial stain cloth. The model sebum artificial stain liquid was printed on the cloth with a gravure roll coater to adhere the artificial stain liquid to the cloth. The step of adhering the model sebum artificial stain liquid to the cloth to prepare the model sebum artificial stain cloth was carried out with a gravure roll cell capacity of 58 $cm^3/m^2$, a coating rate of 1.0 m/min, a drying temperature of 100° C. and a drying time of 1 minute. Cotton 2003 (manufactured by Tanigashira Shoten) was used as the cloth.

*The composition of the model sebum artificial stain liquid was as follows: lauric acid 0.4 mass %, myristic acid 3.1 mass %, pentadecanoic acid 2.3 mass %, palmitic acid 6.2 mass %, heptadecanoic acid 0.4 mass %, stearic acid 1.6 mass %, oleic acid 7.8 mass %, triolein 13.0 mass %, n-hexadecyl palmitate 2.2 mass %, squalene 6.5 mass %, egg white lecithin liquid crystal 1.9 mass %, Kanuma red soil 8.1 mass %, carbon black 0.01 mass %, and the balance of the composition was water (100 mass % in total).

(2) Evaluation of Washing Power

Five pieces of the above prepared model sebum artificial stain cloth (6 cm×6 cm) were washed with a tergotometer (Ueshima, MS-8212) at 85 rpm for 10 minutes. All washes were made under the following washing condition: city water (3.5° dH, 25° C.) was added to the liquid detergent compositions for fibers listed in Tables 1 to 6 such that the concentration of the compositions was 0.083 mass %; and the water temperature was 25° C. After washing, rinsing with city water (25° C.) for 3 minutes, and then drying, were performed.

The washing rates (%) of the five pieces were measured by the following method, and the average value thereof was determined. The results are shown in Tables 1 to 6. Note that the reflectances at 550 nm of the original cloth before staining and before and after washing were measured with a colorimeter (manufactured by NIPPON DENSHOKU INDUSTRIES Co., Ltd., Z-300A). In this evaluation, a composition attaining a higher washing rate is preferable as it is more excellent in washing performance.

Washing rate (%)=100×[(reflectance after washing−reflectance before washing)/(reflectance of original cloth−reflectance before washing)]

[Method for Evaluating Ease of Removal]

(1) Pretreatment of Clothing to be Evaluated

About 4 kg of clothing to be evaluated was equally divided in advance into portions of about 2 kg, and each portion was repeatedly washed consecutive five times using a nonionic surfactant (an ethylene oxide adduct of lauryl alcohol (the average number of added moles was 8)) in the fully automatic washing machine Panasonic NA-F70PB11 (the used amount of the nonionic surfactant 4.5 g, standard course, water amount 45 L, water temperature 25° C., washing time 10 minutes and water-saving rinsing twice). After that, the clothing was dried for one day under the condition of 25° C. and 43% RH. Here, about 4 kg of the clothing to be evaluated was as follows: 5 commercially available towels (Senshu Towel, 100% cotton, 34 cm×86 cm), 4 commercially available bath towels (Belle Maison, 100% cotton), 10 commercially available undershirts (Gunze YG undershirt (L), 100% cotton), 5 commercially available dress shirts (UNIQLO big silhouette shirt (M), 100% cotton), 5 commercially available T-shirts (UNIQLO crew-neck T-shirt, 100% cotton) and 2 pairs of commercially available pants (UNIQLO chino pants (XL), 100% cotton).

(2) Washing of Clothing to be Evaluated 27 g of each composition in Tables 1 to 6 was weighed, with which 4 kg of the pre-treated clothing to be evaluated was washed with the standard course (washing for 8 minutes, rinsing once and dehydration for 6 minutes) of a fully automatic washing and drying machine (manufactured by TOSHIBA CORPORATION, AW-8D7) under the condition of 54 L of tap water (25° C.) and a total amount of 4 kg of the clothing.

(3) Evaluation of Ease of Removal

Evaluations were made for ease of removal of clothing when the clothing was removed one by one from a washing tub after dehydration into a laundry basket after the washing process (2). Evaluations were made in such a manner that 6 skilled persons gave scores on the basis of the following criteria with the case of washing with the composition of comparative example 1-1 as the reference case, and the average score of the 6 persons was calculated. The evaluation scores given by the 6 persons were totaled and the average score was calculated. The tables show the values rounded off to two decimal places. The results are shown in Tables 1 to 6. In this evaluation, a composition attaining a higher average score is preferable as it achieves more excellent ease of removal.

Such an evaluation of ease of removal of textile products after dehydration not only serves as an indicator of a finish with less entanglement of textile products with one another and suppressed damage to textile products, but also is an indicator relevant to ease of subsequent processes such as hanging or folding of clothing, from which it can be known how they are facilitated.

1 . . . compared to the case of washing with the composition of comparative example 1-1, the clothing was tangled and difficult to remove 0 . . . the clothing was removed as easily as the clothing washed with the composition of comparative example 1-1

1 . . . compared to the case of washing with the composition of comparative example 1-1, the clothing was slightly less likely to be tangled and easier to remove 2 . . . compared to the case of washing with the composition of comparative example 1-1, the clothing was less likely to be tangled and easier to remove

TABLE 1

| | | | | Example | | | Comparative example | | | | | |
|---|---|---|---|---|---|---|---|---|---|---|---|---|
| | | | | 1-1 | 1-2 | 1-3 | 1-1 | 1-2 | 1-3 | 1-4 | 1-5 | 1-6 |
| Liquid detergent composition for fibers | Formulation component (mass %) | (a) | Sodium di-2 ethylhexyl sulfosuccinate | 10 | | | | 20 | | | | |
| | | | Sodium bis-2-propylheptyl sulfosuccinate | | 10 | 10 | | | 20 | | 3 | 18 |
| | | (b) (b1) | APES | 10 | 10 | 10 | | | | 20 | 17 | 2 |
| | | (c) | Propylene glycol | 10 | 10 | | 10 | 10 | 10 | 10 | 10 | 10 |
| | | | Butyldiglycol | | | 10 | | | | | | |
| | | | Water | Balance | Balance | Balance | Balance | Balance | Balance | Balance | Balance | Balance |
| | | | Total | 100 | 100 | 100 | 100 | 100 | 100 | 100 | 100 | 100 |
| | | | (a)/[(a) + (b1)] (mass %) | 50.00 | 50.00 | 50.00 | — | 100.00 | 100.00 | 0.00 | 15.00 | 90.00 |
| | | | (a)/[(a) + (b2)] (mass %) | 100.00 | 100.00 | 100.00 | — | 100.00 | 100.00 | — | 100.00 | 100.00 |
| | | | (b1)/(b2) (mass ratio) | — | — | — | — | — | — | — | — | — |
| | | | (c)/(a) (mass ratio) | 1.00 | 1.00 | 1.00 | — | 0.50 | 0.50 | — | 3.33 | 0.00 |
| | | | Washing rate (%) | 37.00 | 26.48 | 26.51 | 0.34 | 5.55 | 1.80 | 40.72 | 38.76 | 2.43 |
| | | | Ease of removal | 0.50 | 1.00 | 1.00 | (Reference) | 0.50 | 1.33 | −0.17 | 0.00 | 1.33 |

TABLE 2

| | | | | Example | | Comparative example | |
|---|---|---|---|---|---|---|---|
| | | | | 2-1 | 2-2 | 2-1 | 2-2 |
| Liquid detergent composition for fibers | Formulation component (mass %) | (a) | Sodium bis-2-propylheptyl sulfosuccinate | 10 | 10 | 3 | 18 |
| | | (b) (b1) | APES | 10 | 5 | 10 | 1 |
| | | (b2) | $C12/14EO_9PO_2EO_9$ | 10 | 5 | 7 | 1 |
| | | (c) | Propylene glycol | 10 | 10 | 10 | 10 |
| | | | Water | Balance | Balance | Balance | Balance |
| | | | Total | 100 | 100 | 100 | 100 |
| | | | (a)/[(a) + (b1)] (mass %) | 50.00 | 66.67 | 23.08 | 94.74 |
| | | | (a)/[(a) + (b2)] (mass %) | 50.00 | 66.67 | 30.00 | 94.74 |
| | | | (b1)/(b2) (mass ratio) | 1.00 | 1.00 | 1.43 | 1.00 |
| | | | (c)/(a) (mass ratio) | 1.00 | 1.00 | 3.33 | 0.00 |
| | | | Washing rate (%) | 41.12 | 30.20 | 38.21 | 5.43 |
| | | | Ease of removal | 1.17 | 1.33 | 0.00 | 1.33 |

TABLE 3

| | | | | Example | | Comparative example |
|---|---|---|---|---|---|---|
| | | | | 3-1 | 3-2 | 3-1 |
| Liquid detergent composition for fibers | Formulation component (mass %) | (a) | Sodium di-2 ethylhexyl sulfosuccinate | 10 | | |
| | | | Sodium bis-2-propylheptyl sulfosuccinate | | 10 | |
| | | (b) (b1) | LAS | 10 | 10 | 20 |
| | | (c) | Propylene glycol | 10 | 10 | 10 |
| | | | Water | Balance | Balance | Balance |
| | | | Total | 100 | 100 | 100 |
| | | | (a)/[(a) + (b1)] (mass %) | 50.00 | 50.00 | 0.00 |
| | | | (a)/[(a) + (b2)] (mass %) | 100.00 | 100.00 | — |
| | | | (b1)/(b2) (mass ratio) | — | — | — |
| | | | (c)/(a) (mass ratio) | 1.00 | 1.00 | — |
| | | | Washing rate (%) | 18.33 | 15.26 | 25.53 |
| | | | Ease of removal | 0.67 | 1.33 | 0.17 |

TABLE 4

| | | | | Example 4-1 | Comparative example 4-1 |
|---|---|---|---|---|---|
| Liquid detergent composition for fibers | Formulation component (mass %) | (a) | Sodium bis-2-propylheptyl sulfosuccinate | 10 | |
| | | (b) (b2) | MEE | 10 | 20 |
| | | (c) | Propylene glycol | 10 | 10 |
| | | | Water | Balance | Balance |
| | | | Total | 100 | 100 |
| (a)/[(a) + (b1)] (mass %) | | | | 100.00 | — |
| (a)/[(a) + (b2)] (mass %) | | | | 50.00 | 0.00 |
| (b1)/(b2) (mass ratio) | | | | 0.00 | — |
| (c)/(a) (mass ratio) | | | | 1.00 | — |
| Washing rate (%) | | | | 20.85 | 46.40 |
| Ease of removal | | | | 1.17 | 0.00 |

TABLE 5

| | | | | Example | Comparative example | |
|---|---|---|---|---|---|---|
| | | | | 5-1 | 5-1 | 5-2 |
| Liquid detergent composition for fibers | Formulation component (mass %) | (a) | Sodium bis-2-propylheptyl sulfosuccinate | 10 | 3 | 18 |
| | | (b) (b2) | $C12/14EO_9PO_2EO_9$ | 10 | 17 | 2 |
| | | (c) | Propylene glycol | 10 | 10 | 10 |
| | | | Water | Balance | Balance | Balance |
| | | | Total | 100 | 100 | 100 |
| (a)/[(a) + (b1)] (mass %) | | | | 100.00 | 100.00 | 100.00 |
| (a)/[(a) + (b2)] (mass %) | | | | 50.00 | 15.00 | 90.00 |
| (b1)/(b2) (mass ratio) | | | | 0.00 | 0.00 | 0.00 |
| (c)/(a) (mass ratio) | | | | 1.00 | 0.00 | 0.00 |
| Washing rate (%) | | | | 28.24 | 38.24 | 3.12 |
| Ease of removal | | | | 1.00 | 0.00 | −0.17 |

TABLE 6

| | | | | Example | | | | |
|---|---|---|---|---|---|---|---|---|
| | | | | 6-1 | 6-2 | 6-3 | 6-4 | 6-5 |
| Liquid detergent composition for fibers | Formulation component (mass %) | (a) | Sodium bis-2-propylheptyl sulfosuccinate | 10 | 15 | 15 | 3 | 10 |
| | | (b) (b1) | APES | | | 5 | | |
| | | | LAS | | | | 2 | |
| | | (b2) | $C12/14EO_{10}$ | 10 | 5 | 5 | | |
| | | | $C12/14PO_{3.7}EO_{16.5}$ | | | | 15 | 10 |
| | | (c) | Propylene glycol | 10 | 10 | 10 | 10 | 10 |
| | | | Water | Balance | Balance | Balance | Balance | Balance |
| | | | Total | 100 | 100 | 100 | 100 | 100 |
| (a)/[(a) + (bl)] (mass %) | | | | 100.00 | 100.00 | 75.00 | 60.00 | 100.00 |
| (a)/[(a) + (b2)] (mass %) | | | | 50.00 | 75.00 | 75.00 | 16.67 | 50.00 |
| (b1)/(b2) (mass ratio) | | | | 0.00 | 0.00 | 1.00 | 0.13 | 0.00 |
| (c)/(a) (mass ratio) | | | | 1.00 | 0.67 | 0.67 | 3.33 | 1.00 |
| Washing rate (%) | | | | 28.76 | 10.19 | 25.69 | 36.30 | 30.34 |
| Ease of removal | | | | 0.83 | 1.33 | 1.33 | 1.00 | 1.00 |

The invention claimed is:

1. A detergent composition for fibers comprising the following components (a) and (b), component (a): a compound comprising a cation and bis-2-propylheptyl sulfosuccinate as an anion; and component (b): one or more surfactants selected from the following components (b1) and (b2) (excluding component (a)), component (b1): at least one anionic surfactant selected from the group consisting of APES and LAS, and component (b2): one or more nonionic surfactants selected from the group consisting of MEE, $C12/14EO_9PO_2EO_9$, $C12/14EO_{10}$, and $C12/14PO_{3.7}EO_{16.5}$, wherein the composition satisfies at least one of the following requirements (1) and (2), requirement (1): a proportion of a content of the component (a) to a total content of the components (a) and (b1) is 50 mass % to 75 mass %, and requirement (2): a proportion of the content of the component (a) to a total content of the components (a) and (b2) is 50 mass % to 75 mass %.

2. The detergent composition for fibers according to claim 1, comprising the components (b1) and (b2) as the component (b), wherein a proportion of the component (b1) to the component (b2) by mass ratio, (b1)/(b2), is 0.01 or more and 1 or less.

3. The detergent composition for fibers according to claim 1, further comprising a solvent having a hydroxyl group as a component (c).

4. The detergent composition for fibers according to claim 3, wherein the component (c) is one or more organic solvents selected from the following components (c1) to (c4):

component (c1): a monohydric alcohol with 2 or more and 6 or less carbons;

component (c2): a dihydric or more and dodecahydric or less alcohol with 2 or more and 12 or less carbons;

component (c3): an organic solvent having a hydrocarbon group with 1 or more and 8 or less carbons (excluding an aromatic group that may be partially substituted), an ether group and a hydroxyl group; and component (c4): an organic solvent having an aromatic group that may be partially substituted, an ether group and a hydroxyl group.

5. The detergent composition for fibers according to claim 3, wherein a proportion of the component (c) to the component (a) by mass ratio, (c)/(a), is 0.6 or more and 5.0 or less.

6. A method for treating a textile product comprising, washing the textile product with a washing liquid obtained by mixing the following components (a) and (b) with water, and thereafter rinsing the textile product with water, component (a): a compound comprising a cation and bis-2-propylheptyl sulfosuccinate as an anion; and component (b): one or more surfactants selected from the following components (b1) and (b2) (excluding component (a)), component (b1): at least one anionic surfactant selected from the group consisting of APES and LAS, and component (b2): one or more nonionic surfactants selected from the group consisting of MEE, $C12/14EO_9PO_2EO_9$, $C12/14EO_{10}$, and $C12/14PO_{3.7}EO_{16.5}$, wherein the washing liquid satisfies at least one of the following requirements (1) and (2), requirement (1): a proportion of a content of the component (a) to a total content of the components (a) and (b1) in the washing liquid is 50 mass % to 75 mass %, and requirement (2): a proportion of the content of the component (a) to a total content of the components (a) and (b2) in the washing liquid is 50 mass % to 75 mass %.

7. The method according to claim 6, wherein the component (b) comprises the components (b1) and (b2), wherein a proportion of the component (b1) to the component (b2) by mass ratio, (b1)/(b2), is 0.01 or more and 1 or less.

8. The method according to claim 6, wherein the washing liquid further comprises a solvent having a hydroxyl group as a component (c).

9. The method according to claim 8, wherein the component (c) is one or more organic solvents selected from the following components (c1) to (c4):

component (c1): a monohydric alcohol with 2 or more and 6 or less carbons;

component (c2): a dihydric or more and dodecahydric or less alcohol with 2 or more and 12 or less carbons;

component (c3): an organic solvent having a hydrocarbon group with 1 or more and 8 or less carbons (excluding an aromatic group that may be partially substituted), an ether group and a hydroxyl group; and component (c4): an organic solvent having an aromatic group that may be partially substituted, an ether group and a hydroxyl group.

10. The method according to claim 8, wherein a proportion of the component (c) to the component (a) by mass ratio, (c)/(a), is 0.6 or more and 5.0 or less.

11. The detergent composition for fibers according to claim 1, wherein the compound comprising bis-2-propylheptyl sulfosuccinate is sodium bis-2-propylheptyl sulfosuccinate.

12. The method according to claim 6, wherein the compound comprising bis-2-propylheptyl sulfosuccinate is sodium bis-2-propylheptyl sulfosuccinate.

* * * * *